United States Patent
Kusakabe

(10) Patent No.: US 10,983,733 B2
(45) Date of Patent: Apr. 20, 2021

(54) SYSTEM AND PRINTING APPARATUS FOR PERFORMING TRANSMITTING PROCESSING FOR AN APPLICATION AND BROWSER, AND METHODS FOR THE SYSTEM AND THE PRINTING APPARATUS

(71) Applicant: CANON KABUSHIKI KAISHA, Tokyo (JP)

(72) Inventor: Taketoshi Kusakabe, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/523,311

(22) Filed: Jul. 26, 2019

(65) Prior Publication Data
US 2020/0042258 A1    Feb. 6, 2020

(30) Foreign Application Priority Data
Aug. 6, 2018  (JP) .............................. JP2018-148024

(51) Int. Cl.
*G06F 3/12* (2006.01)
*G03G 15/00* (2006.01)

(52) U.S. Cl.
CPC ......... *G06F 3/1205* (2013.01); *G03G 15/502* (2013.01); *G06F 3/1204* (2013.01); *G06F 3/1206* (2013.01); *G06F 3/1207* (2013.01); *G06F 3/1208* (2013.01); *G06F 3/1288* (2013.01)

(58) Field of Classification Search
None
See application file for complete search history.

(56) References Cited

U.S. PATENT DOCUMENTS

| | | | | |
|---|---|---|---|---|
| 6,785,023 B1* | 8/2004 | Iida | ..................... | H04N 1/00204 358/1.15 |
| 7,454,476 B2* | 11/2008 | Kim | ..................... | G06F 11/0709 358/1.14 |
| 9,436,414 B2* | 9/2016 | Kamath | ................ | G06F 3/1203 |
| 10,740,049 B2* | 8/2020 | Ohara | ................... | G06F 3/1297 |
| 2002/0165924 A1* | 11/2002 | Kim | ..................... | G06F 11/0709 709/209 |
| 2005/0018235 A1* | 1/2005 | Shikata | ................. | G06F 3/1207 358/1.14 |
| 2009/0021780 A1* | 1/2009 | Sato | ................... | H04N 1/00347 358/1.15 |
| 2010/0332920 A1* | 12/2010 | Ashida | .................... | G06F 9/451 714/57 |

(Continued)

FOREIGN PATENT DOCUMENTS

JP          2014160350 A     9/2014

*Primary Examiner* — Dung D Tran
(74) *Attorney, Agent, or Firm* — Venable LLP

(57) ABSTRACT

An application operating on a first apparatus transmits a change request to a second apparatus in response to a user's operation on the application, and a browser operating on the first apparatus periodically transmits an update request for a screen displayed in the browser to the second apparatus. If an update request received from the first apparatus that is the same as a transmission source of the change request is an update request received for the first time since the change request is received from the first apparatus, the second apparatus transmits a screen corresponding to the change request to the first apparatus as a response to the update request.

24 Claims, 10 Drawing Sheets

(56) References Cited

U.S. PATENT DOCUMENTS

| | | | |
|---|---|---|---|
| 2011/0055736 A1* | 3/2011 | Kang | H04N 1/00424 |
| | | | 715/760 |
| 2011/0119333 A1* | 5/2011 | Tamura | H04N 1/00222 |
| | | | 709/203 |
| 2012/0072557 A1* | 3/2012 | Fujisawa | H04L 67/146 |
| | | | 709/220 |
| 2015/0248265 A1* | 9/2015 | Kang | H04B 5/0031 |
| | | | 358/1.15 |
| 2016/0344884 A1* | 11/2016 | Suzuki | H04N 1/00891 |
| 2017/0017439 A1* | 1/2017 | Kang | G06F 3/1229 |
| 2018/0121147 A1* | 5/2018 | Nagamatsu | G06F 3/1206 |

* cited by examiner

FIG. 5

Press Web UI

- OUTLINE
- INK
- SHEET
- ERROR
- SYSTEM

STATE : PRINTING ( ERROR )

REMAINING INK AMOUNT : NONE
REMAINING SHEET AMOUNT : LOW

FIG. 6

Press Web UI

- OUTLINE
- INK
- SHEET
- ERROR
- SYSTEM

| COLOR | STATE | REMAINING AMOUNT | MODEL NUMBER |
|---|---|---|---|
| C | GOOD | 70% | INC001-C |
| M | GOOD | 70% | INC001-M |
| Y | LOW | 5% | INC001-Y |
| K | NONE | 0% | INC001-K |

FIG. 7

Press Web UI

- OUTLINE
- INK
- SHEET
- ERROR
- SYSTEM

| ID | STATE | REMAINING AMOUNT | SHEET NAME | SHEET MODEL NUMBER |
|---|---|---|---|---|
| Tray1 | LOW | 5% | GLOSSY PAPER | GLORSS001 |
| | | | | |
| | | | | |
| | | | | |

FIG. 8

Press Web UI

- OUTLINE
- INK
- SHEET
- ERROR
- SYSTEM

C  M  Y  K

| ID | STATE |
|---|---|
| 0001 | PAPER JAM |
| 0002 | REMAINING INK AMOUNT : NONE |
| 8001 | REMAINING INK AMOUNT LOW |
| 8002 | REMAINING SHEET AMOUNT LOW |

FIG. 11A

| REQUEST SOURCE IP ADDRESS | SCREEN CHANGE REQUEST | REQUEST SOURCE SESSION ID |
|---|---|---|
| — | — | — |
| — | — | — |

FIG. 11B

| REQUEST SOURCE IP ADDRESS | SCREEN CHANGE REQUEST | REQUEST SOURCE SESSION ID |
|---|---|---|
| 192.168.1.10 | — | — |
| — | — | — |

FIG. 11C

| REQUEST SOURCE IP ADDRESS | SCREEN CHANGE REQUEST | REQUEST SOURCE SESSION ID |
|---|---|---|
| 192.168.1.10 | error | — |
| — | — | — |

FIG. 11D

| REQUEST SOURCE IP ADDRESS | SCREEN CHANGE REQUEST | REQUEST SOURCE SESSION ID |
|---|---|---|
| 192.168.1.10 | error | ABCDEF |
| — | — | — |

FIG. 11E

| REQUEST SOURCE IP ADDRESS | SCREEN CHANGE REQUEST | REQUEST SOURCE SESSION ID |
|---|---|---|
| 192.168.1.10 | error | ABCDEF |
| 192.168.1.11 | — | — |

SYSTEM AND PRINTING APPARATUS FOR PERFORMING TRANSMITTING PROCESSING FOR AN APPLICATION AND BROWSER, AND METHODS FOR THE SYSTEM AND THE PRINTING APPARATUS

BACKGROUND OF THE INVENTION

Field of the Invention

The present invention relates to a system, a method of controlling the system, a printing apparatus, and a method of controlling the printing apparatus.

Description of the Related Art

A form in which a given terminal connected to an apparatus across a network controls the apparatus exists. For example, there is a form capable of using, with respect to a printing apparatus, a print job control application for performing printing control at a terminal, and a function (so-called Web UI) that allows a versatile web browser to refer to the UI of the printing apparatus.

Japanese Patent Application No. 2013-30364 discloses a technique by which a web server notifies a control target device of a request from a control terminal.

Recently, cases in which a web browser displays contents provided by a web server are increasing in number. There is a demand to be able to have arisen for further improving the convenience of this web browser display process.

SUMMARY OF THE INVENTION

According to the first aspect of the present invention, there is provided a system comprising a first apparatus and a second apparatus, wherein an application for controlling the second apparatus and a browser for displaying information of the second apparatus are operating on the first apparatus, the application transmits a change request to the second apparatus in response to a user's operation on the application, and the browser periodically transmits an update request for a screen displayed in the browser to the second apparatus, and receives and displays a screen transmitted from the second apparatus as a response to the update request, and if an update request received from the first apparatus that is the same as a transmission source of the change request is an update request received for the first time since the change request is received from the first apparatus, the second apparatus transmits a screen corresponding to the change request to the first apparatus as a response to the update request.

According to the second aspect of the present invention, there is provided a printing apparatus comprising: a communication unit configured to communicate with an information processing apparatus on which an application for controlling the printing apparatus and a browser for displaying information about the printing apparatus can operate; a receiving unit configured to receive a change request transmitted based on a user's operation on the application, and an update request for a screen displayed in the browser; and a transmitting unit configured to, if an update request received from the information processing apparatus that is the same as a transmission source of the change request is an update request received for the first time since the change request is received from the information processing apparatus, transmit a screen corresponding to the change request to the information processing apparatus as a response to the update request.

According to the third aspect of the present invention, there is provided a method of controlling a system comprising a first apparatus and a second apparatus, wherein an application for controlling the second apparatus and a browser for displaying information of the second apparatus are operating on the first apparatus, the application transmits a change request to the second apparatus in response to a user's operation on the application, and the browser periodically transmits an update request for a screen displayed in the browser to the second apparatus, and receives and displays a screen transmitted from the second apparatus as a response to the update request, and if an update request received from the first apparatus that is the same as a transmission source of the change request is an update request received for the first time since the change request is received from the first apparatus, the second apparatus transmits a screen corresponding to the change request to the first apparatus as a response to the update request.

According to the fourth aspect of the present invention, there is provided a method of controlling a printing apparatus, comprising: communicating with an information processing apparatus on which an application for controlling the printing apparatus and a browser for displaying information about the printing apparatus can operate; receiving a change request transmitted based on a user's operation on the application, and an update request for a screen displayed in the browser; and if an update request received from the information processing apparatus that is the same as a transmission source of the change request is an update request received for the first time since the change request is received from the information processing apparatus, transmitting a screen corresponding to the change request to the information processing apparatus as a response to the update request.

Further features of the present invention will become apparent from the following description of exemplary embodiments (with reference to the attached drawings).

BRIEF DESCRIPTION OF THE DRAWINGS

FIG. 5 is a view showing a display example of the screen of a Web UI client application (WUI01);
FIG. 6 is a view showing a display example of the screen of the Web UI client application (WUI01);
FIG. 7 is a view showing a display example of the screen of the Web UI client application (WUI01);
FIG. 8 is a view showing a display example of the screen of the Web UI client application (WUI01);
FIGS. 11A to 11E are views showing configuration examples of a management table.

DESCRIPTION OF THE EMBODIMENTS

Embodiments of the present invention will be described with reference to the accompanying drawings. Note that the embodiments to be described below are examples of detailed implementation of the present invention or detailed examples of the arrangement described in the appended claims. In each view, arrows X and Y indicate horizontal directions perpendicular to each other. An arrow Z indicates a vertical direction.

<Printing System>

Figure 1:
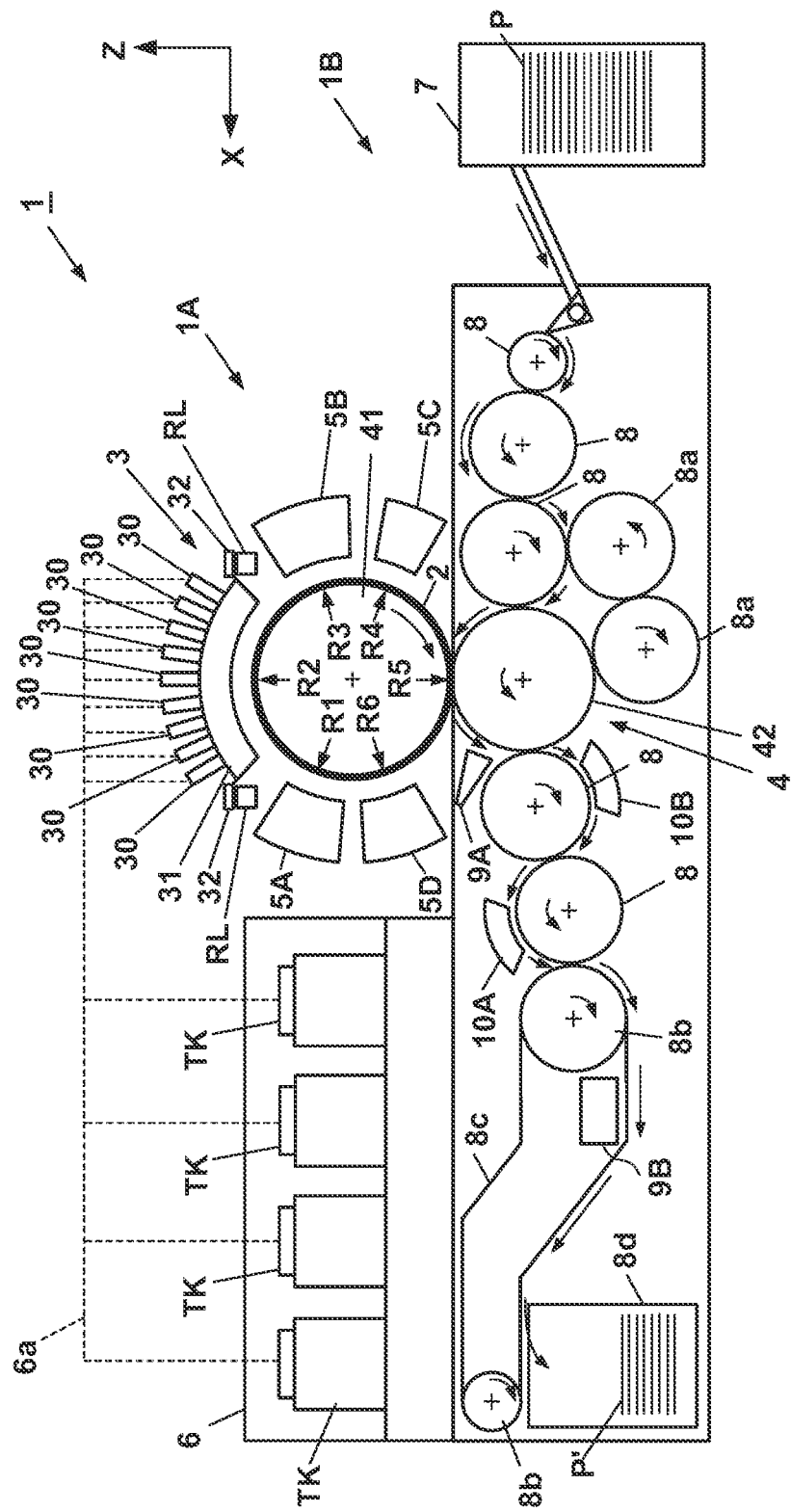
FIG. 1 is a schematic view of a printing system.

FIG. 1 is a front view schematically showing a printing system 1 according to an embodiment of the present invention. The printing system 1 is a sheet-fed inkjet printer for forming a printed product P' by transferring an ink image onto a printing medium P via a transfer member 2. The printing system 1 includes a printing apparatus 1A and a conveyance apparatus 1B. In this embodiment, the X, Y, and Z directions respectively indicate the widthwise direction (total-length direction), the depth direction, and the height direction of the printing system 1. The printing medium P is conveyed in the X-direction.

Note also that "printing" includes not only a case in which meaningful information such as characters and figures are formed, but also a case in which images, designs, and patterns are formed on a printing medium, regardless of whether they are meaningful or meaningless, or a medium is processed. It does not matter whether or not information is visualized so that a human can visually perceive it. In addition, this embodiment assumes sheet-like paper as "the printing medium", but it is also possible to use, for example, a piece of cloth or a plastic film. Ink components are not particularly limited. However, this embodiment assumes the use of aqueous pigment ink containing a pigment as a coloring material, water, and a resin.

<Printing Apparatus>

The printing apparatus 1A includes a printing unit 3, a transfer unit 4, peripheral units 5A to 5D, and a supply unit 6.

<Printing Unit>

Figure 2:
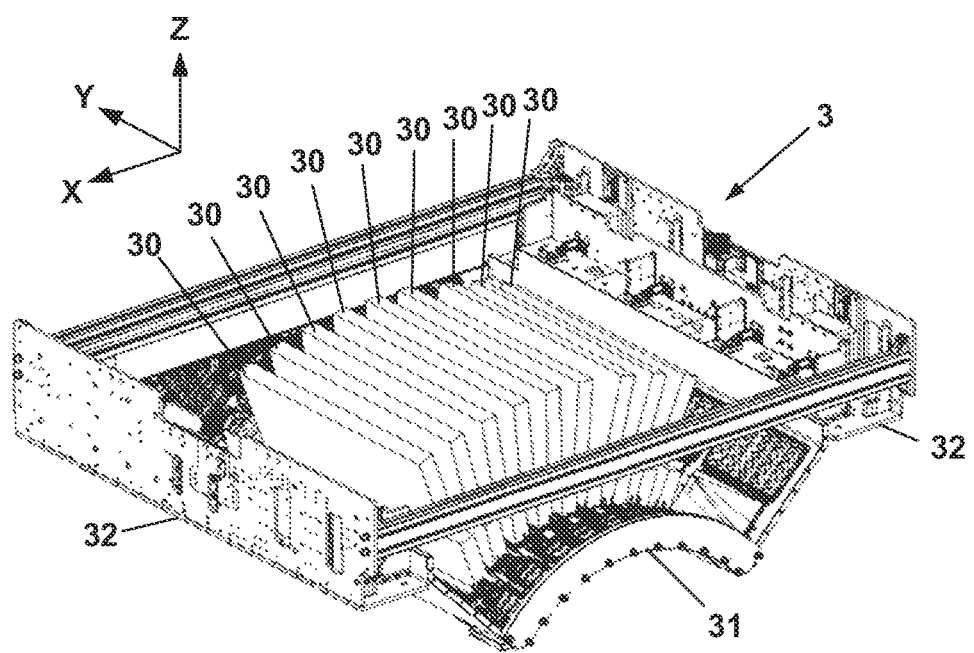
FIG. 2 is a perspective view of a printing unit.

The printing unit 3 includes a plurality of printheads 30 and a carriage 31. Reference figures are FIGS. 1 and 2. FIG. 2 is a perspective view of the printing unit 3. The printheads 30 discharge liquid ink onto a transfer member 2, thereby forming an ink image of a printing image on the transfer member 2.

In this embodiment, each printhead 30 is a full-line head extended in the Y direction, and nozzles are arranged in a range covering the width of an image printing area of a printing medium having a maximum usable size. The lower surface of the printhead 30 is an ink discharge surface in which nozzle holes are formed, and the ink discharge surface faces the surface of the transfer member 2 with a small gap (for example, a few mm) being formed between them. In this embodiment, the transfer member 2 cyclically moves on a circular orbit, so the plurality of printheads 30 are radially arranged.

Each nozzle has a discharging element. The discharging element is, for example, an element for discharging ink from the nozzle by generating a pressure in the nozzle, and the technique of an inkjet head of a well-known inkjet printer is applicable. Examples of the discharging element are an element that discharges ink by forming an air bubble by causing film boiling of ink by a thermoelectric converter, an element that discharges ink by an electromechanical converter, and an element that discharges ink by using static electricity. From the point of view of high-speed, high-density printing, a discharge unit using the electromechanical converter can be used.

This embodiment uses nine printheads 30. The nine printheads 30 discharge different types of ink. The different types of ink are, for example, ink components containing different coloring materials, and ink components such as yellow ink, magenta ink, cyan ink, and black ink. One printhead 30 discharges one type of ink, but one printhead 30 may also discharge different types of ink. When using the plurality of printheads 30 as described above, some printheads may also discharge ink containing no coloring material (for example, clear ink).

The carriage 31 supports the plurality of printheads 30. The end portion on the ink discharge surface side of each printhead 30 is fixed to the carriage 31. This makes it possible to precisely maintain the gap between the ink discharge surface and the surface of the transfer member 2. The carriage 31 is displaceable, with the printheads 30 being mounted on it, by being guided by guide members RL. In this embodiment, the guide member RL is a rail member extended in the Y direction, and a pair of guide members RL are formed apart in the X direction. A slide portion 32 is formed on each side portion of the carriage 31 in the X direction. The slide portions 32 engage with the guide members RL and slide in the Y direction along the guide members RL.

<Transfer Unit>

The transfer unit 4 will be explained with reference to FIG. 1. The transfer unit 4 includes a transfer drum 41 and a pressurizing drum 42. Each drum is a rotating member that rotates around the rotational axis in the Y direction, and has a cylindrical outer peripheral surface. Referring to FIG. 1, an arrow shown in each of the transfer drum 41 and the pressurizing drum 42 indicates the rotational direction. The transfer drum 41 rotates clockwise, and the pressurizing drum 42 rotates counterclockwise.

The transfer drum 41 is a support member that supports the transfer member 2 on the outer peripheral surface. On the outer peripheral surface of the transfer drum 41, the transfer member 2 is continuously or intermittently formed in the circumferential direction. When continuously formed, the transfer member 2 is formed into an endless belt shape. When intermittently formed, the transfer member 2 is divided into a plurality of belt-like segments having ends. These segments can circularly be arranged at equal pitches on the outer peripheral surface of the transfer drum 41.

When the transfer drum 41 rotates, the transfer member 2 cyclically moves on the circular orbit. In accordance with the rotational phase of the transfer drum 41, the position of the transfer member 2 can be classified into a discharge pre-processing region R1, a discharge region R2, discharge post-processing regions R3 and R4, a transfer region R5, and a transfer post-processing region R6. The transfer member 2 cyclically passes through these regions.

The discharge pre-processing region R1 is a region where pre-processing is performed on the transfer member 2 before ink discharge by the printing unit 3, and is a region where the peripheral unit 5A performs processing. In this embodiment, a reaction solution is given. The discharge region R2 is a region where the printing unit 3 forms an ink image by discharging ink on the transfer member 2. The discharge post-processing regions R3 and R4 are processing regions where the ink image is processed after ink discharge. The discharge post-processing region R3 is a region where the peripheral unit 5B performs processing. The discharge region R4 is a region where the peripheral unit 5C performs processing. The transfer region R5 is a region where the ink image on the transfer member 2 is transferred onto the printing medium P by the transfer unit 4. The transfer post-processing region R6 is a region where post-processing is performed on the transfer member 2 after transfer, and is a region where the peripheral unit 5D performs processing.

In this embodiment, the discharge region R2 is a region having a predetermined zone. The zones of the regions R1 and R3 to R6 are narrower than the zone of the discharge region R2. In this embodiment, when compared to the face of a clock, the discharge pre-processing region R1 is at the position of about 10 o'clock, the discharge region R2 is within the range from about 11 o'clock to about 1 o'clock, the discharge post-processing region R3 is at the position of about 2 o'clock, and the discharge post-processing region R4 is at the position of about 4 o'clock. The transfer region R5 is at the position of about 6 o'clock, and the transfer post-processing region R6 is at the position of about 8 o'clock.

The transfer member 2 can be formed by a single layer, and can also be formed as a stack of a plurality of layers. When using a plurality of layers, for example, the transfer member 2 can include a surface layer, an elastic layer, and a compressed layer. The surface layer is an outermost layer having an image formation surface on which an ink image is formed. When the compressed layer is formed, the compressed layer absorbs deformation and disperses a local pressure fluctuation. This makes it possible to maintain the transferability even during high-speed printing. The elastic layer is a layer between the surface layer and the compressed layer.

As the material of the surface layer, various materials such as a resin and ceramic can suitably be used, and a material having a high compressive elastic modulus can be used in respect of the durability. Practical examples are an acrylic resin, an acrylic silicone resin, a fluorine-containing resin, and a condensate obtained by condensing a hydrolyzable organic silicon compound. A surface treatment can also be performed on the surface layer in order to improve the wettability to a reaction solution and the image transferability. Examples of the surface treatment are a flame treatment, a corona treatment, a plasma treatment, polishing, roughening, active energy beam irradiation, an ozone treatment, a surfactant treatment, and silane coupling. A plurality of treatments may be combined. It is also possible to form an arbitrary surface shape on the surface layer.

Examples of the material of the compressed layer are acrylonitrile-butadiene rubber, acryl rubber, chloroprene rubber, urethane rubber, and silicone rubber. When molding a rubber material like this, it is possible to blend a predetermined amount of a vulcanizing agent or a vulcanization accelerator, and blend a filler such as a foaming agent, hollow fine particles, or salt as needed, thereby forming a porous rubber material. Consequently, bubble portions are compressed with a volume change against various pressure fluctuations, thereby decreasing deformation in the compressing direction. Accordingly, it is possible to obtain stabler transferability and durability. The porous rubber material can be classified into a continuous porous structure in which pores continue, and an independent porous structure in which pores are independent. It is possible to use either structure or use the both structures together.

As the material of the elastic layer, various materials such as a resin and ceramic can suitably be used. In respect of the processability, various elastomer materials and rubber materials can be used. Practical examples are fluoro silicone rubber, phenyl silicone rubber, fluorine rubber, chloroprene rubber, urethane rubber, and nitrile rubber. Other examples are ethylenepropylene rubber, natural rubber, styrene rubber, isoprene rubber, butadiene rubber, an ethylene/propylene/butadiene copolymer, and nitrile butadiene rubber. In particular, silicone rubber, fluoro silicone rubber, and phenyl silicone rubber have a small compression set and hence are advantageous in dimensional stability and durability. These rubber materials are also advantageous in transferability because a change in elastic modulus by the temperature is small.

Various adhesives and double-sided tapes can be used between the surface layer and the elastic layer and between the elastic layer and the compressed layer in order to fix them. The transfer member 2 can also include a reinforcing layer having a high compression elastic modulus in order to suppress lateral elongation when attaching the transfer member 2 on the transfer drum 41 and to maintain the firmness. A woven fabric can be used as the reinforcing layer. The transfer member 2 can be manufactured by freely combining the layers made of the above-mentioned materials.

The outer peripheral surface of the pressurizing drum 42 is urged against the transfer member 2. At least one grip mechanism for holding the leading edge of the printing medium P is formed on the outer peripheral surface of the pressurizing drum 42. A plurality of grip mechanisms may also be formed apart in the circumferential direction of the pressurizing drum 42. The printing medium P is conveyed in tight contact with the outer peripheral surface of the pressurizing drum 42. When the printing medium P passes through a nip portion between the pressurizing drum 42 and the transfer member 2, an ink image on the transfer member 2 is transferred onto the printing medium P.

<Peripheral Units>

The peripheral units 5A to 5D are arranged around the transfer member 2. In this embodiment, the peripheral units 5A to 5D are an application unit, an absorbing unit, a heating unit, and a cleaning unit in that order.

The application unit 5A is a mechanism that applies a reaction solution on the transfer member 2 before ink discharge by the printing unit 3. The reaction solution is a liquid containing a component that increases the viscosity of ink. "Increase the viscosity of ink" means that the color material or the resin forming the ink comes in contact with the viscosity-increasing component and chemically reacts with or physically adsorbs the component, thereby raising the viscosity of the ink. This increase in viscosity of ink includes not only a case in which the viscosity of the whole ink rises, but also a case in which a component such as the coloring material or the resin forming the ink partially flocculates and locally raises the viscosity.

The component that increases the viscosity of ink is not particularly limited, and examples are metal ions and a polymer flocculant. It is possible to use a substance that causes a pH change of ink and flocculates the coloring material in the ink, and an organic acid can be used. Examples of a reaction solution application mechanism are a roller, a printhead, a die coating apparatus (die coater), and a blade coating apparatus (blade coater). When the reaction solution is applied to the transfer member 2 before ink is discharged on the transfer member 2, the ink arriving at the transfer member 2 can immediately be fixed. This makes it possible to suppress bleeding that mixes adjacent ink components.

The absorbing unit 5B is a mechanism that absorbs a liquid component from an ink image on the transfer member 2. By reducing the liquid component of the ink image, a blur or the like of an image to be printed on the printing medium P can be suppressed. From a different viewpoint, this reduction in liquid component can also be expressed as condensing ink forming the ink image on the transfer member 2. "Condensing ink" means that the content of the solid components such as the coloring material and the resin contained in the ink increases with respect to the liquid component contained in the ink because the liquid component reduces.

The absorbing unit 5B includes a liquid absorbing member that comes in contact with an ink image and reduces the amount of liquid component of the ink image. The liquid absorbing member can be formed on the outer peripheral surface of the roller, and can also be formed into an endless sheet-like shape and cyclically moved. To protect an ink image, it is also possible to make the moving velocity of the liquid absorbing member and the peripheral speed of the transfer member 2 equal to each other and move the liquid absorbing member in synchronism with the transfer member 2.

The liquid absorbing member can contain a porous body that comes in contact with an ink image. To suppress adhesion of the ink solid components to the liquid absorbing member, the pore size of that surface of the porous body, which comes in contact with an ink image, can be 10 µm or less. The pore size is the average diameter and can be measured by well-known methods such as a mercury penetration method, a nitrogen adsorption method, and SEM image observation. Note that the liquid component is not particularly limited as long as it does not have any predetermined shape, has fluidity, and has an almost constant volume. Examples are water and an organic solvent contained in ink or the reaction solution.

The heating unit 5C is a mechanism that heats an ink image on the transfer member 2. When the ink image is heated, the resin in the ink image dissolves, and this improves the transferability to the printing medium P. The heating temperature can be a minimum filming temperature (MFT) of the resin or more. MFT can be measured by generally known methods, for example, devices complying with JIS K 6828-2:2003 and ISO2115:1996. From the viewpoint of the transferability and the image fastness, heating can be performed at a temperature higher by 10° C. or more than MFT, and can also be performed at a temperature higher by 20° C. or more than MFT. As the heating unit 5C, it is possible use well-known heating devices, for example, various lamps such as an infrared lamp and a hot air fan. An infrared heater can be used from the viewpoint of the heating efficiency.

The cleaning unit 5D is a mechanism that cleans the surface of the transfer member 2 after transfer. The cleaning unit 5D removes ink remaining on the transfer member 2 and dust and the like on the transfer member 2. As the cleaning unit 5D, it is possible to suitably use well-known methods such as a method of bringing a porous member into contact with the transfer member 2, a method of rubbing the surface of the transfer member 2 with a brush, and a method of scraping the surface of the transfer member 2 with a blade. Also, as a cleaning member to be used in cleaning, well-known shapes such as a roller shape and a web shape can be used.

As described above, this embodiment includes the application unit 5A, the absorbing unit 5B, the heating unit 5C, and the cleaning unit 5D as peripheral units. It is also possible to give a function of cooling the transfer member 2, or add a cooling unit, to some of these units. In this embodiment, the heat of the heating unit 5C sometimes raises the temperature of the transfer member 2. After the printing unit 3 discharges ink to the transfer member 2, if the ink image exceeds the boiling point of water as a main solvent of the ink, the liquid component absorbability to the absorbing unit 5B sometimes decreases. The liquid component absorbability can be maintained by cooling the transfer member 2 so that the discharged ink is kept lower than the boiling point of water.

The cooling unit can be a blowing mechanism that blows air to the transfer member 2, or a mechanism that brings a member (for example, a roller) into contact with the transfer member 2 and cools this member by air cooling or water cooling. The cooling unit may also be a mechanism that cools the cleaning member of the cleaning unit 5D. The cooling timing can be a period after transfer and before application of the reaction solution.

<Supply Unit>

The supply unit 6 is a mechanism for supplying ink to each printhead 30 of the printing unit 3. The supply unit 6 may also be installed at the back of the printing system 1. The supply unit 6 includes a storage unit TK for storing ink for each ink type. The storage unit TK can include a main tank and a sub tank. Each storage unit TK and each printhead 30 communicate with each other by a channel 6a, and the storage unit TK supplies ink to the printhead 30. The channel 6a may also be a channel that circulates ink between the storage unit TK and the printhead 30, and the supply unit 6 may also include a pump or the like for circulating ink. A deaerating mechanism for removing air bubbles from ink can be installed midway along the channel 6a or in the storage unit TK. A valve for adjusting the hydraulic pressure of ink and the atmospheric pressure can be installed midway along the channel 6a or in the storage unit TK. The heights of the storage unit TK and the printhead 30 in the Z direction can be so designed that the ink surface in the storage unit TK is lower than the ink discharge surface of the printhead 30.

<Conveyance Apparatus>

The conveyance apparatus 1B is an apparatus for supplying the printing medium P to the transfer unit 4, and discharging the printed product P' on which an ink image is transferred from the transfer unit 4. The conveyance apparatus 1B includes a feed unit 7, a plurality of conveyance drums 8 and 8a, two sprockets 8b, a chain 8c, and a collection unit 8d. In FIG. 1, an arrow shown inside the figure of each part of the conveyance apparatus 1B indicates the rotational direction of the part, and an arrow shown outside the figure of each part indicates the conveyance path of the printing medium P or the printed product P'. The printing medium P is conveyed from the feed unit 7 to the transfer unit 4, and the printed product P' is conveyed from the transfer unit 4 to the collection unit 8d. The side of the feed unit 7 will sometimes be called an upstream side in the conveyance direction, and the side of the collection unit 8d will sometimes be called a downstream side.

The feed unit 7 includes a stacking unit for stacking a plurality of printing media P, and a feeding mechanism for feeding the printing media P one by one from the stacking unit to the conveyance drum 8 on the most upstream side. Each of the conveyance drums 8 and 8a is a rotating member that rotates around the rotational axis in the Y direction, and has a cylindrical outer peripheral surface. At least one grip mechanism for holding the leading edge of the printing medium P (or the printed product P') is installed on the outer peripheral surface of each of the conveyance drums 8 and 8a. The gripping operation and the release operation of each grip mechanism are controlled so that the printing medium P is transferred between adjacent conveyance drums.

The two conveyance drums 8a are conveyance drums for reversing the printing medium P. When performing two-sided printing on the printing medium P, after transfer is performed on the obverse surface, the printing medium P is not transferred from the pressurizing drum 42 to an adjacent conveyance drum 8 on the downstream side but transferred to the conveyance drum 8a. The printing medium P is turned over via the two conveyance drums 8a, and transferred to the pressurizing drum 42 again via the conveyance drum 8 on the upstream side of the pressurizing drum 42. Consequently, the reverse surface of the printing medium P comes in contact with the transfer drum 41, and an ink image is transferred onto the reverse surface.

The chain 8c is wound between the two sprockets 8b. One of the two sprockets 8b is a driving sprocket, and the other is a driven sprocket. When the driving sprocket rotates, the chain 8c cyclically moves. A plurality of grip mechanisms are arranged apart from each other in the longitudinal direction of the chain 8c. The grip mechanism grips the leading edge of the printed product P'. The printed product P' is transferred to the grip mechanism of the chain 8c from the conveyance drum 8 positioned on the downstream side, and the printed product P' gripped by the grip mechanism is conveyed to the collection unit 8d by the movement of the chain 8c, and released from the gripping. Accordingly, the printed product P' is stacked in the collection unit 8d.

<Post-Processing Unit>

The conveyance apparatus 1B includes post-processing units 10A and 10B. The post-processing units 10A and 10B are mechanisms that are arranged downstream of the transfer unit 4, and perform post-processing on the printed product P'. The post-processing unit 10A performs processing on the obverse surface of the printed product P', and the post-processing unit 10B performs processing on the reverse surface of the printed product P'. An example of the processing contents is coating to be performed on the image printing surface of the printed product P' for the purposes of image protection, lustering, and the like. Examples of the contents of coating are application of a liquid, welding of a sheet, and lamination.

<Inspection Units>

The conveyance apparatus 1B includes inspection units 9A and 9B. The inspection units 9A and 9B are mechanisms that are arranged downstream of the transfer unit 4 and perform inspection on the printed product P'.

In this embodiment, the inspection unit 9A is an imaging device for capturing an image printed on the printed product P', and includes an imaging element such as a CCD sensor or a CMOS sensor. The inspection unit 9A captures a printed image during a printing operation that is continuously performed. Based on the image captured by the inspection unit 9A, it is possible to check changes in colors and the like of the printed image with time, and determine whether to correct image data or printing data. In this embodiment, the imaging range of the inspection unit 9A is set on the outer peripheral surface of the pressurizing drum 42, and the inspection unit 9A is so arranged as to be able to partially capture a printed image immediately after transfer. The inspection unit 9A can perform inspection on all printed images, and can also perform inspection on every predetermined number of images.

In this embodiment, the inspection unit 9B is also an imaging device for capturing an image printed on the printed product P', and includes an imaging element such as a CCD sensor or a CMOS sensor. The inspection unit 9B captures a printed image during a test printing operation. The inspection unit 9B captures the whole printed image, and the basic settings of various corrections related to printing data can be performed based on the image captured by the inspection unit 9B. In this embodiment, the inspection unit 9B is arranged in a position where the inspection unit 9B images the printed product P' conveyed by the chain 8c. When capturing a printed image by the inspection unit 9B, the movement of the chain 8c is temporarily stopped, and the whole image is captured. The inspection unit 9B may also be a scanner for scanning the surface of the printed product P'.

<Control Unit>

Figure 3:
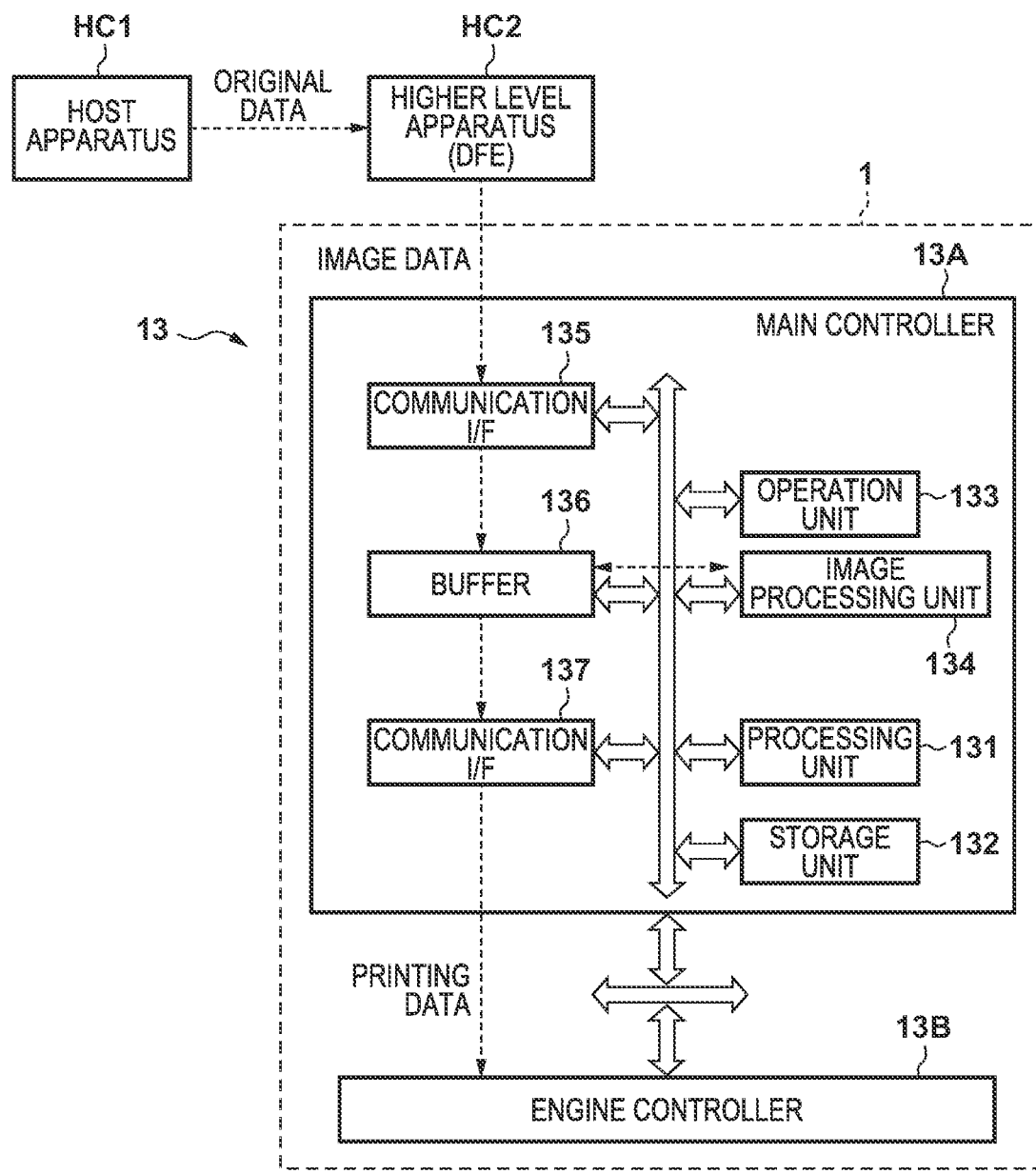
FIG. 3 is a block diagram of a control unit 13 of a printing system 1.

Next, a control unit of the printing system 1 will be explained. FIG. 3 is a block diagram of a control unit 13 of the printing system 1. The control unit 13 is communicably connected to a host apparatus (DFE) HC2, and the host apparatus HC2 is communicably connected to a host apparatus HC1.

The host apparatus HC1 generates or saves original data as the original of a printed image. This original data is generated by the format of an electronic file such as a document file or an image file. The original data is transmitted to the host apparatus HC2, and the host apparatus HC2 converts the received original data into a data format (for example, RGB data expressing an image by RGB) usable by the control unit 13. The host apparatus HC2 transmits the converted data as image data to the control unit 13, and the control unit 13 starts a printing operation based on the received image data.

A print job control application (JCA) is operating on the host apparatus HC2, and performs various kinds of data communication with the control unit 13. Note that the host apparatus HC2 will also simply be called an information processing apparatus hereinafter. That is, the JCA is held to be operable in the information processing apparatus. For example, the host apparatus HC2 transmits a print control command related to image data and a command for obtaining status information of the printing system 1 to the control unit 13, and displays information transmitted from the control unit 13 in response to a command on the display screen. A web browser is also operating on the host apparatus HC2, and obtains information about the printing system 1 by periodically communicating with a Web UI server operating on the control unit 13 (a process unit 131). The screen displayed in the web browser is a screen for displaying information more detailed than information to be displayed on the screen of the JCA. In this embodiment, the communication with the control unit 13 is performed using HTTP (HyperText Transfer Protocol).

In this embodiment, the control unit 13 is roughly divided into a main controller 13A and an engine controller 13B. The main controller 13A includes a process unit 131, a storage unit 132, an operation unit 133, an image processing unit 134, a communication I/F (interface) 135, a buffer 136, and a communication I/F 137.

The processing unit 131 is a processor such as a CPU, and controls the whole main controller 13A by executing programs stored in the storage unit 132. The storage unit 132 is a storage device such as a RAM, a ROM, a hard disk, or an SSD. The storage unit 132 stores programs to be executed by the processing unit 131 and data, and provides a work area for the processing unit 131. The operation unit 133 is an input device such as a touch panel, a keyboard, or a mouse, and accepts user's instructions.

The image processing unit 134 is a device including an image processor or the like. Details of the image processing unit 134 will be described later. The buffer 136 is, for example, a RAM, a hard disk, or an SSD. The communication I/F 135 communicates with the host apparatus HC2, and the communication I/F 137 communicates with the engine controller 13B. In FIG. 3, broken-line arrows exemplarily indicate the flow of image data process. Image data received from the host apparatus HC2 via the communication I/F 135 is stored in the buffer 136.

The image processing unit 134 reads out image data from the buffer 136, performs predetermined image processing on the readout image data, and stores the processed image data in the buffer 136 again. This processed image data stored in the buffer 136 is transmitted as printing data to be used by the print engine from the communication OF 137 to the engine controller 13B.

In this embodiment, the printing unit 3 includes the plurality of printheads 30. However, the printing unit 3 may also include one printhead 30. The printhead 30 need not be a full-line head, and it is also possible to use a serial method of forming an ink image while scanning the printhead 30 in the Y direction.

The conveying mechanism of the printing medium P may also be another method such as a method conveying the printing medium P by sandwiching it between a pair of rollers. In this method of conveying the printing medium P by using a pair of rollers, it is possible to use a roll sheet as the printing medium P, and form the printed product P' by cutting the roll sheet after transfer. In this embodiment, the transfer member 2 is formed on the outer peripheral surface of the transfer drum 41. However, it is also possible to use another method such as a method of forming the transfer member 2 into the shape of an endless belt, and cyclically moving the transfer member 2.

Figure 12:
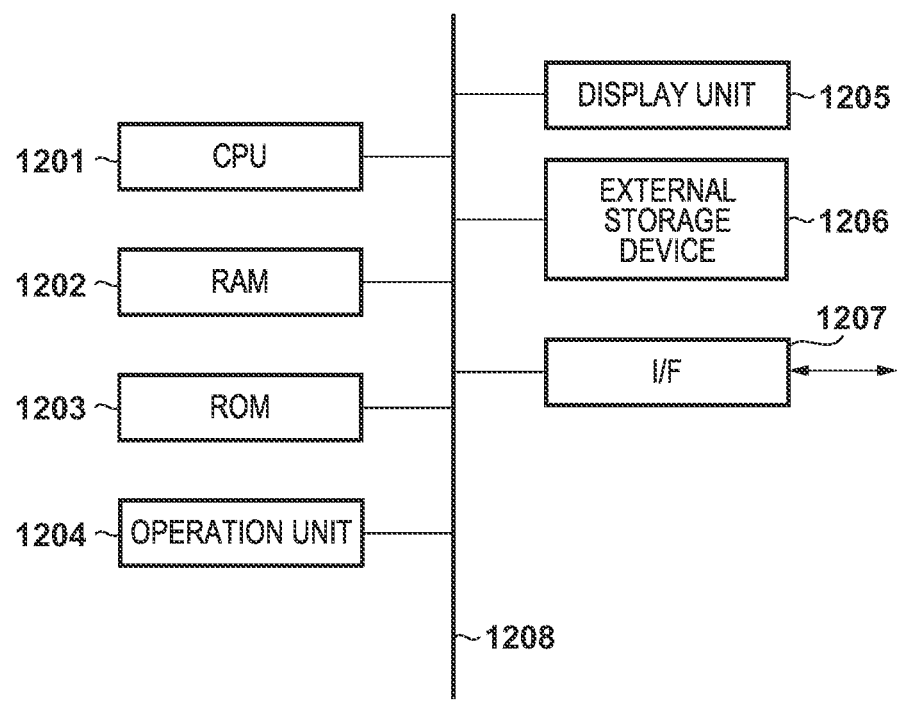
FIG. 12 is a block diagram showing a hardware configuration example of a host apparatus HC2.

A hardware configuration example of the host apparatus HC2 will be explained below by using a block diagram shown in FIG. 12. A CPU 1201 executes various processes by using computer programs and data stored in a RAM 1202 and a ROM 1203. Thus, the CPU 1201 controls the operation of the whole host apparatus HC2, and executes or controls various processes that will be explained as processes to be performed by the host apparatus HC2. In the following description, an explanation will be made by taking the JCA or the web browser as a main unit of processing in some cases. In practice, however, the CPU 1201 implements the operation of the JCA or the web browser by executing the computer program of the JCA or the web browser.

The RAM 1202 has an area for storing computer programs and data loaded from the ROM 1203 and an external storage device 1206, and data received from the outside (for example, the host apparatus HC1 and the control unit 13) via an OF 1207. The RAM 1202 also has a work area which the CPU 1201 uses to execute various processes. Thus, the RAM 1202 can provide the various areas as needed. The ROM 1203 stores information not to be rewritten, such as the setting data and activation program of the host apparatus HC2.

An operation unit 1204 includes user interfaces such as a keyboard, a mouse, and a touch panel, and can input various instructions to the CPU 1201 when operated by the user.

A display unit 1205 is a liquid crystal screen or a touch panel screen, and can display the processing results of the CPU 1201 by using images and characters. Note that the display unit 1205 may also be a projection apparatus such as a projector for projecting images and characters.

The external storage device 1206 is a large-capacity information storage device such as a hard disk drive. The external storage device 1206 stores an OS (Operating System), and computer programs and data for causing the CPU 1201 to execute or control various processes that will be explained as processes to be performed by the host apparatus HC2. The computer programs stored in the externa storage device 1206 include computer programs of the JCA and computer programs of the web browser. Also, the data stored in the external storage device 1206 includes data of the JCA, data of the web browser, and data to be processed as known information by the host apparatus HC2. The computer programs and data stored in the external storage device 1206 are loaded into the RAM 1202 as needed under the control of the CPU 1201, and processed by the CPU 1201.

The I/F 1207 functions as a communication interface for performing data communication with the outside (for example, the host apparatus HC1 or the control unit 13). The CPU 1201, the RAM 1202, the ROM 1203, the operation unit 1204, the display unit 1205, the external storage device 1206, and the I/F 1207 are connected to a bus 1208.

Figure 4:
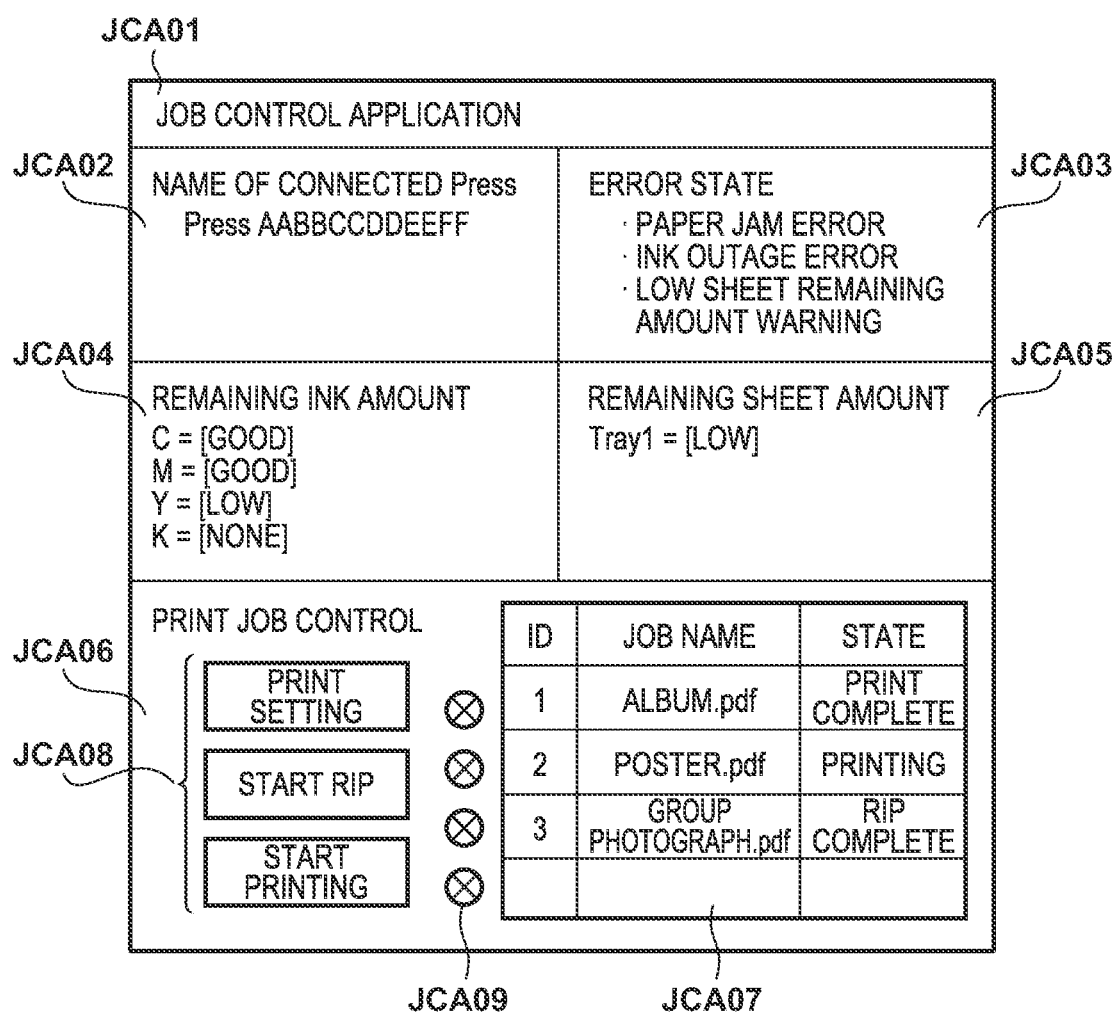
FIG. 4 is a view showing a display example of the screen of a print job control application (JCA01)

A display example of the screen of a print job control application (JCA01) operating on the host apparatus HC2 will be explained below with reference to FIG. 4. The screen of the JCA01 is displayed on the display unit 1205 when the CPU 1201 executes the computer program of the JCA01.

Assume that the display unit 1205 displays all screens that will be explained as screens to be displayed on the host apparatus HC2, and the CPU 1201 controls display of the screens on the host apparatus HC2. Assume also that the user performs all operations on the screen displayed on the host apparatus HC2 by operating the operation unit 1204.

The JCA01 has five small areas (JCA02 to JCA06), and implements functions pertaining to screen display by exchanging the various commands as described above with a counter application operating on the processing unit 131 of the control unit 13.

The small area JCA02 is an area for displaying information unique to the printing system 1 connected to the JCA01 (the host apparatus HC2), such as the name of the printing system 1. Note that when the JCA01 is activated, the JCA01 obtains information to be displayed in the JCA02 to the JCP06 by communicating with the printing system 1, and displays the information in the JCA02 to the JCA06. Note that the information obtained from the printing system 1 when the JCA01 is activated contains the IP address of the printing system 1. Note that the contents of the small areas JCA03 to JCA06 are updated based on information obtained by the JCA01 by periodically performing communication (polling) with the printing system 1. The small area JCA03 is an area for displaying information (an error state) about an error occurring in the printing system 1 connected to the JCA01 (the host apparatus HC2).

The small area JCA04 is an area for displaying the remaining amount (ink remaining amount) of ink as a consumable necessary for printing in the printing system 1 connected to the JCA01 (the host apparatus HC2). The small area JCA05 is an area for displaying the remaining amount (sheet remaining amount) of sheets as consumables necessary for printing in the printing system 1 connected to the JCA01 (the host apparatus HC2).

The small area JCA06 is an area for displaying and operating information about print job control in the printing system 1 connected to the JCA01 (the host apparatus HC2). The small area JCA06 includes an area JCA07 for displaying information of a print job, buttons JCA08 for operating the print job selected in the area JCA07, and a button JCA09 for canceling the print job currently being processed.

A display example of the screen of a Web UI client application (WUI01) operating on the host apparatus HC2 will be explained below with reference to FIG. 5. Note that the screen of the Web UI client application (WUI01) is a general web browser. Note also that the web client application is held to be operable in the information processing apparatus.

The WUI01 has two small regions (WUI02 and WUI03), and implements a screen display function by periodically performing HTTP communication with the Web UI server operating on the processing unit 131 of the control unit 13.

The small area WUI02 is a menu area and displays five choices, that is, "outline", "ink", "sheet", "error", and "system". The small area WUI03 is a content area and displays contents corresponding to a choice selected by the WUI02.

To periodically update the display contents in the small area WUI03, the WUI01 transmits (by polling) a screen update request to the Web UI server of the control unit 13 at a predetermined time interval (for example, 5 sec). The Web UI server of the control unit 13 always monitors a request from a Web UI client such as the WUI01. When receiving a request, the Web UI server returns a screen corresponding to the request. When receiving a screen update request, the Web UI server of the control unit 13 transmits a screen corresponding to the screen update request to the WUI01. Accordingly, the WUI01 can obtain the state change (screen) of the printing system 1 within a delay of 5 sec, and displays the screen in the WUI03.

Since "outline" is selected in the WUI02 shown in FIG. 5, the WUI01 transmits a screen update request "outline" to the Web UI server. Therefore, the Web UI server transmits a screen corresponding to the screen update request "outline" as a response, and the WUI01 displays the screen in the WUI03. Consequently, the WUI03 of the WUI01 displays information of the state, remaining ink amount, and remaining sheet amount of the printing system 1, as an outline equivalent to the information displayed in the JCA01.

Since "ink" is selected in the WUI02 shown in FIG. 6, the WUI01 transmits a screen update request "ink" to the Web UI server. Accordingly, the Web UI server transmits a screen corresponding to the screen update request "ink" as a response, so the WUI01 displays the screen in the WUI03. Consequently, the WUI03 of the WUI01 displays a numerical value indicating the remaining amount, and the model number, in addition to the color and the state, as detailed information of the ink used in the printing system 1.

Since "sheet" is selected in the WUI02 shown in FIG. 7, the WUI01 transmits a screen update request "sheet" to the Web UI server. Therefore, the Web UI server transmits a screen corresponding to the screen update request "sheet" as a response, so the WUI01 displays the screen in the WUI03. Consequently, the WUI03 of the WUI01 displays a numerical value indicating the remaining amount, the sheet name, and the sheet model number, in addition to the tray number (ID) and the state, as detailed information of the sheet in the printing system 1.

Since "error" is selected in the WUI02 shown in FIG. 8, the WUI01 transmits a screen update request "error" to the Web UI server. Accordingly, the Web UI server transmits a screen corresponding to the screen update request "error" as a response, so the WUI01 displays the screen in the WUI03. Consequently, the WUI03 of the WUI01 displays, as detailed information of errors occurring in the printing system 1, the states of ink and sheets and a paper jam portion, in addition to a list of the errors occurring in the system.

Figure 9:
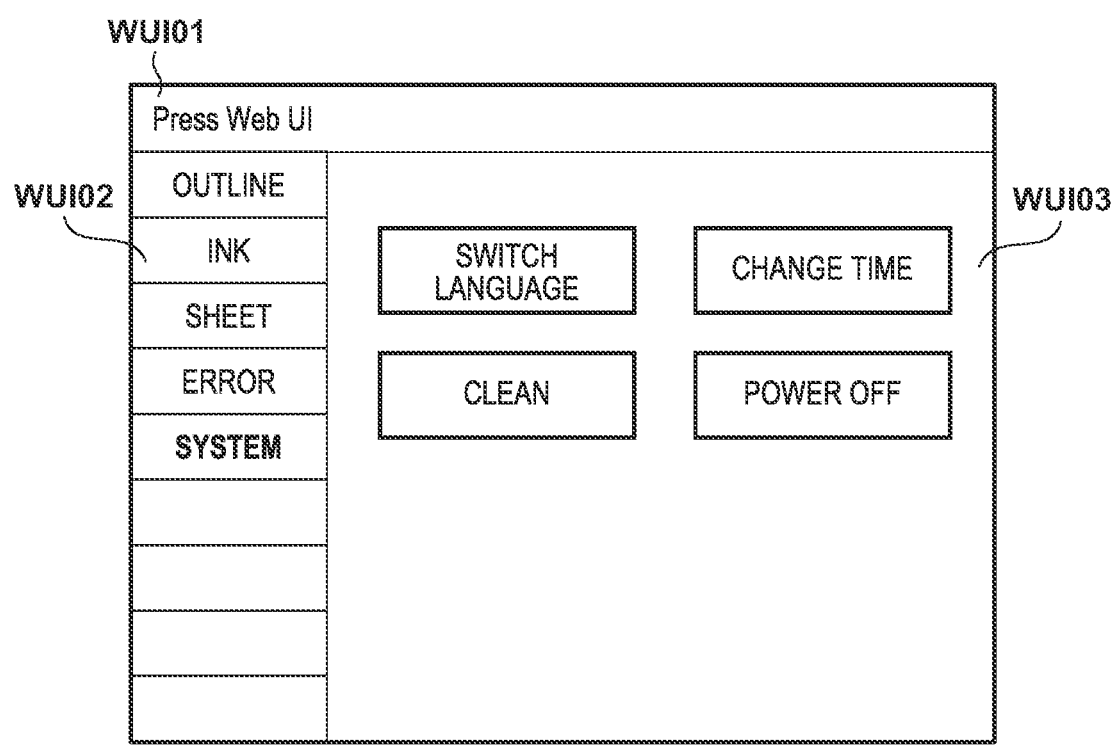
FIG. 9 is a view showing a display example of the screen of the Web UI client application (WUI01)

Since "system" is selected in the WUI02 shown in FIG. 9, the WUI01 displays buttons for performing processes necessary for the system operation, such as "switch languages", "change time", "clean up", and "power off", in the WUI03.

When the user selects each of the small areas JCA02 to JCA05 of the JCA01 described above, the selected small area performs a command issuing process for cooperating with the Web UI server operating on the processing unit 131 of the control unit 13.

When the user selects the small area JCA02, the JCA01 activates a web client application, and causes the web browser to display the top page of the Web UI server of the control unit 13 (performs so-called web page shortcut activation). As described above, the IP address of the printing system 1 is obtained when the JCA01 is activated. By using this IP address, the JCP01 can cause the web browser to display the top page of the Web UI server of the control unit 13, in accordance with selection in the small area JCA02. Note that it is also possible to allow the user to log in after the top page is displayed.

When the user selects the small area JCA03, the JCA01 transmits a screen change request "error" to the Web UI server of the control unit 13 by HTTP communication. More specifically, the JCA01 transmits the screen change request "error" containing a URL "https://Printer-IPAddress/WUI/index?sc=error" to the Web UI server of the control unit 13. "Error" at the end of the URL indicates that display of an error screen is requested. When the user selects the small area JCA04, the JCA01 transmits a screen change request "ink" to the Web UI server of the control unit 13 by HTTP communication. When the user selects the small area JCA05, the JCA01 transmits a screen change request "sheet" to the Web UI server of the control unit 13 by HTTP communication. Note that after the screen change request is transmitted to the Web UI server of the control unit 13, the operations of the Web UI server and the WUI01 of the control unit 13 are the same as described above except that the name "screen update request" of the request is "screen change request". That is, when receiving a screen change request, the Web UI server of the control unit 13 transmits a screen corresponding to the screen change request to the HC2, and causes the web browser to display the screen.

Figure 10:
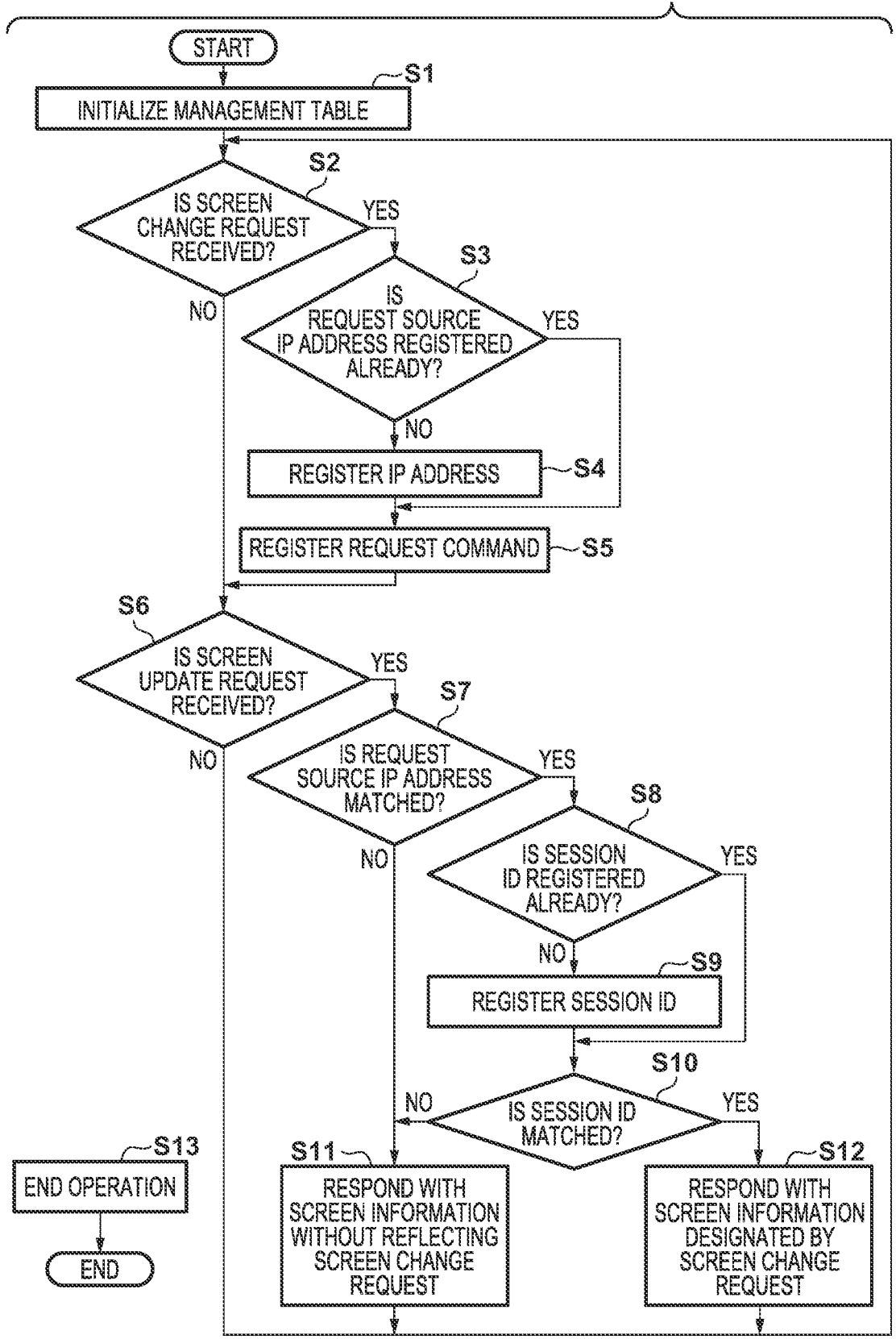
FIG. 10 is a flowchart of the operation of a Web UI server.

The operation of the Web UI server operating on the processing unit 131 of the control unit 13 will be explained below with reference to a flowchart shown in FIG. 10. Note that the CPU 1201 implements this flowchart shown in FIG. 10 by reading out a program of the flowchart from the memory and executing the program. In step S1, the Web UI server initializes a management table managed (held) by the storage unit 132. FIG. 11A shows a configuration example of the management table initialized in step S1. The management table is a table for registering an IP address (request source IP address) contained in a screen change request, the contents of the screen change request, and the session ID (request source session ID) of a screen update request received for the first time from an apparatus having the request source IP address. Note that examples of the contents of the screen change request are "error", "ink", and "sheet". As shown in FIG. 11A, nothing is registered in the initialized management table. Note that the configuration of the initialized management table is not limited to a specific configuration, and a predetermined value such as NULL may also be registered as each of the values of all items (the request source IP address, the screen change request, and the request source session ID). Then, the Web UI server starts accepting a screen change notification from the JCA, and polling from the WUI01.

In step S2, the Web UI server determines whether a screen change request is received from the JCA. If it is determined that the screen change request is received from the JCA, the process advances to step S3; if not, the process advances to step S6. Note that the screen change request contains information by which the screen change request can be identified. Therefore, the Web UI server executes the determination process in step S2 based on this information by which the screen change request can be identified.

In step S3, the Web UI server identifies the request source IP address by referring to a TCP header portion of the screen change request received from the JCA via the HTTP. Furthermore, the Web UI server identifies the contents (for example, "error", "ink", or "sheet") of the screen change request, which is contained in an argument part of the URL contained in the screen change request received from the JCA via the HTTP. Then, the Web UI server determines whether the request source IP address identified by referring to the TCP header portion of the screen change request received from the JCA via the HTTP is registered in the management table. If it is determined that the request source IP address is registered, the process advances to step S5; if not, the process advances to step S4.

In step S4, the Web UI server registers, in the management table, the request source IP address identified by referring to the TCP header portion of the screen change request in step S3. FIG. 11B shows a configuration example of the management table in which the request source IP address is registered in step S4.

In step S5, the Web UI server registers (overwrites) the contents of the screen change request contained in the argument part of the URL contained in the screen change request received from the JCA via the HTTP in the same row as the row in which the request source IP address of the screen change request is registered. That is, the Web UI server registers, in the management table, the request source IP address identified by referring to the TCP header portion of the screen change request, and the contents of the screen change request contained in the argument part of the URL contained in the screen change request, in association with each other. FIG. 11C shows a configuration example of the management table in which the contents of the screen change request are registered in step S5. That is, since the user has selected the small area JCA03, "error" is registered as the contents of the screen change request as shown in FIG. 11C. Note that as is apparent from FIG. 11C, the Web UI server does not save the session ID of the screen change request issued from the JCA.

In step S6, the Web UI server determines whether a screen update request is received from the WUI01. As described above, the WUI01 transmits a screen update request (by polling) to the Web UI server of the control unit 13 at a predetermined time interval (for example, 5 sec). The Web UI server receives a screen update request by polling from the WUI01. Note that the Web UI server may also receive a screen update request from the WUI01 at a timing different from that of polling. If it is determined that the screen change request is received, the process advances to step S7; if not, the process advances to step S2. Note that the screen update request contains information by which the screen update request can be identified. Therefore, the Web UI server executes the determination process in step S6 based on this information by which the screen update request can be identified.

In step S7, the Web UI server determines whether "the transmission source IP address of the screen update request" contained in a TCP header portion of the screen update request matches any of the request source IP addresses registered in the management table. If it is determined that "the transmission source IP address of the screen update request" matches one of the request source IP addresses registered in the management table, the process advances to step S8. On the other hand, if it is determined that "the transmission source IP address of the screen update request" does not match any of the request source IP addresses registered in the management table, the process advances to step S11.

In step S8, the Web UI server determines whether the request source session ID is registered in the management table in association with the request source IP address matching "the transmission source IP address of the screen update request". If it is determined that the request source session ID is registered in the management table in association with the request source IP address matching "the transmission source IP address of the screen update request", the process advances to step S10. On the other hand, if it is determined that the request source session ID is not registered in the management table in association with the request source IP address matching "the transmission source IP address of the screen update request", the process advances to step S9.

In step S9, the Web UI server registers the request source session ID of the screen update request in the same row as the request source IP address matching "the transmission source IP address of the screen update request". That is, step S9 is processing to be executed by the Web UI server when the screen update request received from the same apparatus as the transmission source of the screen change request is a screen update request received for the first time after the screen change request is received from the same apparatus. By this processing, the request source session ID of the screen update request is registered in association with the request source IP address matching "the transmission source IP address of the screen update request". Note that the IP address is an example, and it is also possible to use another identification information such as a MAC address.

The session ID is issued by the Web UI server, is generally a character string contained in Cookie, and is information to be used to hold a series of interactive operations. FIG. 11D shows a configuration example of the management table in which the request source session ID is registered in step S9.

The processing in step S9 is performed when the Web UI server receives a screen change request and then receives a screen update request for the first time after the reception of the screen change request, from the same apparatus (an apparatus having the same IP address) as the apparatus having transmitted the screen change request. That is, the processing in step S9 is performed when a screen change request is received from an apparatus on which the JCA is operating and a screen update request is received for the first time from the WUI01 operating on the same apparatus.

In step S10, the Web UI server searches the management table for a request source IP address matching "the transmission source IP address of the screen update request". Then, the Web UI server determines whether the request source session ID registered in the request source IP address found from the searched management table matches the session ID of the screen update request received from the WUI01. If it is determined that the two session IDs match, the process advances to step S12; if not, the process advances to step S11.

In step S11, the Web UI server transmits a screen reflecting the screen update request, as a response to the screen update request. For example, if the WUI01 issues a screen update request in a state in which FIG. 5 is displayed, a screen corresponding to the outline page is transmitted. On the other hand, if the WUI01 issues a screen update request corresponding to the screen shown in FIG. 6 in a state in which FIG. 6 is displayed, a screen corresponding to the ink page is transmitted.

In step S12, the Web UI server collects information having the contents requested by the screen change request, and transmits a screen displaying the collected information as a response to the screen update request. Note that the contents requested by the screen change request are the screen change request registered in the management table in association with the request source IP address matching "the transmission source IP address of the screen update request". Assume that "error" is registered as the screen change request as shown in FIG. 11D. When the WUI01 performs polling in a state in which a screen related to sheets is displayed as shown in FIG. 7, the Web UI server receives a screen update request related to sheets. In this case, if the session ID of polling received by the Web UI server is "ABCDEF", the Web UI server collects information about "error" requested by the screen change request and transmits the information, as a response to the screen update request related to sheets. As a consequence, the WUI01 having displayed FIG. 7 receives the response in step S12 and changes the screen to be displayed from FIG. 7 to FIG. 8.

The process advances to step S12 when the screen update request received from the transmission source of the screen change request belongs to the same session as the screen update request received for the first time from the transmission source of the screen change request. Accordingly, even when the Web UI screen is displayed in a plurality of web browsers on the same apparatus as the JCA, it is possible to limit web browsers, for which the display contents are changed in response to the operation of the JCA, to one web browser, and limit JCAs, which can change the display contents of the web browser, to one JCA. These limitations uniquely determine a web browser to which the user using the JCA should refer. Therefore, the user need not search for a web browser whenever performing an operation, and this can improve the convenience. Furthermore, this prevents a web browser on which the screen change request is reflected once from accepting an operation from a JCA operating on another apparatus. Note that when the processing in step S12 is executed, the Web UI server updates the screen change request shown in FIG. 11D to a blank state. Consequently, even when the Web UI server determines Yes in step S10, the Web UI server can transmit a screen on which the screen update request is reflected, in response to the screen update request. For example, when the WUI01 performs polling corresponding to the screen shown in FIG. 7 in a state in which the screen related to sheets is displayed as shown in FIG. 7, the Web UI server receives the screen update request related to sheets. In this case, if the session ID of polling received by the Web UI server is "ABCDEF", the Web UI server determines Yes in step S10. Then, the Web UI server recognizes that the screen change request is a blank state by referring to the management table. Accordingly, even when the Web UI server determines Yes in step S10, the Web UI server can transmit a screen on which the screen update request is reflected (that is, a screen related to sheets) in step S12. Note that when the user closes the web browser operating on the host apparatus HC2, the Web UI server does not receive polling from the WUI01 any longer. In this case, the Web UI server initializes the contents of the target row in the management table. This will be explained by using FIG. 11D. When the web browser corresponding to the session ID "ABCDEF" is closed, the Web UI server does not receive polling of the session ID "ABCDEF" any longer. If a predetermined time elapses since polling of the session ID "ABCDEF" is received last, the Web UI server deletes information of the row containing the session ID "ABCDEF" (that is, an IP address "192.168.1.10" or the like).

Note that this embodiment has been explained by assuming that only the host apparatus HC2 is an apparatus on which a JCA and a web browser are operating. However, it is also possible to construct a system in which two or more apparatuses on which a JCA and a web browser are operating can transmit a screen change request and a screen update request to the control unit 13, and the operation of the control unit 13 is the same as described above even in this case. That is, as shown in the flowchart of FIG. 10, whenever a screen change request or a screen update request is received, the corresponding processing need only be performed by repeating the process from step S2. FIG. 11E shows a configuration example of the management table in which, when a screen change request is received from another apparatus having an IP address different from that of the host apparatus HC2, the IP address is registered in step S4.

As processing independent of the processing in steps S1 to S12 described above, the control unit 13 performs a process (step S13) of determining whether the termination condition of the Web UI server is satisfied. For example, when a power OFF instruction is input, the control unit 13 determines that the termination condition of the Web UI server is satisfied. If the termination condition of the Web UI server is satisfied, the control unit 13 terminates the process following the flowchart shown in FIG. 10.

In this embodiment as described above, when reflecting an operation of one application (for example, the JCA01) on the screen of another application (the WUI01), an update target screen is specified to a predetermined screen even if the other application is displaying a plurality of screens. Therefore, the user need only check the specified predetermined screen of the plurality of screens. Consequently, the user need not operate the plurality of screens in order to check the contents, and this can improve the convenience. Also, the configuration and effect of this embodiment have been explained by using an example in which HTTP requests and polling are used in the configuration in which an operation of one application (for example, the JCA01) is reflected on the screen of another application (the WUI01). However, a screen change request may also be notified by using not the HTTP header but the HTTP body by using XML or JSON. Furthermore, the WUI01 of this embodiment accesses the Web UI server by polling. However, various techniques are known as a Web UI synchronization method, so it is also possible to use, for example, Comet, Server-Sent Events, or WebSocket. In addition, the contents and the number of requests such as a screen change request and a screen update request are not limited to specific contents and specific numbers.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-148024, filed Aug. 6, 2018, which is hereby incorporated by reference herein in its entirety.

What is claimed is:

1. A system comprising a first apparatus and a second apparatus, wherein
an application for controlling the second apparatus and a browser for displaying information of the second apparatus are operating on the first apparatus, and
the application transmits a change request to the second apparatus in response to a user's operation on the application, and the browser periodically transmits an update request for updating a screen displayed in the browser to the second apparatus, receives screen information transmitted from the second apparatus as a response to the update request, and displays a screen based on the screen information,
the second apparatus comprising:
a transmission unit configured to transmit, in a case where the update request is received from the browser while the browser is displaying a first screen, first information relating to the first screen, and configured to transmit, in a case where the update request is received from the browser while the browser is displaying a second screen different from the first screen, second information relating to the second screen; and
a storage unit configured to store, in a case where the update request is received from the browser operating on the first apparatus, identification information relating to the browser,
wherein, in a case where the update request is received from the browser which corresponds to the identification information and is displaying the second screen after the change request is received from the application operating on the first apparatus in response to the user's operation on the application operating on the first apparatus, and the change request relates to the first screen, the transmission unit transmits to the browser, as the response to the update request, the first information relating to the first screen corresponding to the change request relating the first screen,
wherein, in a case where the update request is received from another browser which does not correspond to the identification information and is displaying the second screen after the change request is received from the application operating on the first apparatus in response to the user's operation on the application operating on the first apparatus, and the change request relates to the first screen, the transmission unit transmits to the other browser, as the response to the update request, the second information relating to the second screen, and
wherein the transmission unit and the storage unit are implemented by at least one processor of the second apparatus.

2. The system according to claim 1, wherein if an update request received from the first apparatus that is the same as a transmission source of the change request is an update request received for the first time since the change request is received from the first apparatus, a session ID used in the update request received for the first time is held in association with identification information of the first apparatus as the identification information relating to the browser.

3. The system according to claim 2, wherein if the first apparatus transmits a new change request to the second apparatus after the session ID used in transmission of the update request is held in association with the identification information of the first apparatus, and if the first apparatus transmits a new update request to the second apparatus after the new change request is transmitted to the second apparatus, the second apparatus transmits screen information corresponding to the new change request to the first apparatus as a response to the new update request in a case in which a session ID of the new update request received from the first apparatus matches the held session ID.

4. The system according to claim 3, wherein if the session ID of the new update request received from the first apparatus does not match the held session ID, the second apparatus transmits screen information corresponding to the new update request to the first apparatus as a response to the new update request.

5. The system according to claim 1, wherein the application transmits, to the second apparatus, a change request for a screen corresponding to an area selected in the application by a user.

6. The system according to claim 1, wherein a screen to be displayed in the browser is a screen for displaying information more detailed than information to be displayed on a screen of the application.

7. The system according to claim 1, wherein the second apparatus is an apparatus configured to manufacture a printed product by performing printing on a printing medium.

8. The system according to claim 1, wherein the change request includes a request for a screen that displays an error occurring in the second apparatus.

9. The system according to claim 1, wherein the change request includes a request for a screen that displays a remaining amount of ink in the second apparatus.

10. The system according to claim 1, wherein the change request includes a request for a screen that displays a remaining amount of sheets in the second apparatus.

11. The system according to claim 1, wherein the first screen is at least one of a screen that displays an error occurring in the second apparatus, a screen that displays a remaining amount of ink in the second apparatus, and a screen that displays a remaining amount of sheets in the second apparatus.

12. A printing apparatus comprising:
a communication unit configured to communicate with an information processing apparatus on which an application for controlling the printing apparatus and a browser for displaying information about the printing apparatus can operate, wherein the application transmits a change request to the printing apparatus in response to a user's operation on the application and the browser transmits an update request for updating a screen displayed in the browser to the printing apparatus;

a transmission unit configured to transmit, in a case where the update request is received from the browser while the browser is displaying a first screen, first information relating to the first screen, and configured to transmit, in a case where the update request is received from the browser while the browser is displaying a second screen different from the first screen, second information relating to the second screen; and a storage unit configured to store, in a case where the update request is received from the browser operating on the information processing apparatus, identification information relating to the browser, wherein, in a case where the update request is received from the browser which corresponds to the identification information and is displaying the second screen after the change request is received from the application operating on the information processing apparatus in response to the user's operation on the application operating on the information processing apparatus, and the change request relates to the first screen, the transmission unit transmits to the browser, as the response to the update request, the first information relating to the first screen corresponding to the change request relating the first screen, wherein, in a case where the update request is received from another browser which does not correspond to the identification information and is displaying the second screen after the change request is received from the application operating on the information processing apparatus in response to the user's operation on the application operating on the information processing apparatus, and the change request relates to the first screen, the transmission unit transmits to the other browser, as the response to the update request, the second information relating to the second screen, and wherein the communication unit, the transmission unit, and the storage unit are implemented by at least one processor of the printing apparatus.

13. The printing apparatus according to claim 12, wherein if an update request received from the information processing apparatus that is the same as a transmission source of the change request is an update request received for the first time since the change request is received from the information processing apparatus, a session ID used in the update request received for the first time is held in association with identification information of the information processing apparatus as the identification information relating to the browser.

14. The printing apparatus according to claim 13, wherein if the information processing apparatus transmits a new change request to the printing apparatus after the session ID used in transmission of the update request is held in association with the identification information of the information processing apparatus, and if the information processing apparatus transmits a new update request to the printing apparatus after the new change request is transmitted to the printing apparatus, the transmitting unit transmits screen information corresponding to the new change request to the information processing apparatus as a response to the new update request in a case in which a session ID of the new update request received from the information processing apparatus matches the held session ID.

15. The printing apparatus according to claim 14, wherein if the session ID of the new update request received from the information processing apparatus does not match the held session ID, the transmitting unit transmits screen information corresponding to the new update request to the information processing apparatus as a response to the new update request.

16. The printing apparatus according to claim 12, wherein the change request is at least one of a request for a screen that displays an error occurring in the printing apparatus, a request for a screen that displays a remaining amount of ink in the printing apparatus, and a request for a screen that displays a remaining amount of sheets in the printing apparatus.

17. The printing apparatus according to claim 12, wherein the first screen is at least one of a screen that displays an error occurring in the printing apparatus, a screen that displays a remaining amount of ink in the printing apparatus, and a screen that displays a remaining amount of sheets in the printing apparatus.

18. A method of controlling a system comprising a first apparatus and a second apparatus, wherein an application for controlling the second apparatus and a browser for displaying information of the second apparatus are operating on the first apparatus, the application transmits a change request to the second apparatus in response to a user's operation on the application, and the browser periodically transmits an update request for updating a screen displayed in the browser to the second apparatus, receives screen information transmitted from the second apparatus as a response to the update request, and displays a screen based on the screen information; and the second apparatus:

transmits, in a case where the update request is received from the browser while the browser is displaying a first screen, first information relating to the first screen, and transmits, in a case where the update request is received from the browser while the browser is displaying a second screen different from the first screen, second information relating to the second screen; and stores, in a case where the update request is received from the browser operating on the first apparatus, identification information relating to the browser, wherein, in a case where the update request is received from the browser which corresponds to the identification information and is displaying the second screen after the change request is received from the application operating on the first apparatus in response to the user's operation on the application operating on the first apparatus, and the change request relates to the first screen, the second apparatus transmits to the browser, as the response to the update request, the first information relating to the first screen corresponding to the change request relating the first screen, and wherein, in a case where the update request is received from another browser which does not correspond to the identification information and is displaying the second screen after the change request is received from the application operating on the first apparatus in response to the user's operation on the application operating on the first apparatus, and the change request relates to the first screen, the second apparatus transmits to the other browser, as the response to the update request, the second information relating to the second screen.

19. A method of controlling a printing apparatus, comprising:

communicating with an information processing apparatus on which an application for controlling the printing apparatus and a browser for displaying information about the printing apparatus can operate, wherein the application transmits a change request to the printing apparatus in response to a user's operation on the application and the browser transmits an update request for updating a screen displayed in the browser to the printing apparatus;

transmitting, in a case where the update request is received from the browser while the browser is displaying a first screen, first information relating to the first screen, and transmitting, in a case where the update request is received from the browser while the browser displaying a second screen different from the first screen, second information relating to the second screen; and storing, in a case where the update request is received from the browser operating on the information processing apparatus, identification information relating to the browser, wherein, in a case where the update request is received from the browser which corresponds to the identification information and is displaying the second screen after the change request is received from the application operating on the information processing apparatus in response to the user's operation on the application operating on the information processing apparatus, and the change request relates to the first screen, the printing apparatus transmits to the browser, as the response to the update request, the first information relating to the first screen corresponding to the change request relating the first screen, and wherein, in a case where the update request is received from another browser which does not correspond to the identification information and is displaying the second screen after the change request is received from the application operating on the information processing apparatus in response to the user's operation on the application operating on the information processing apparatus, and the change request relates to the first screen, the printing apparatus transmits to the other browser, as the response to the update request, the second information relating to the second screen.

20. The method according to claim 19, wherein if an update request received from the information processing apparatus that is the same as a transmission source of the change request is an update request received for the first time since the change request is received from the information processing apparatus, a session ID used in the update request received for the first time is held in association with identification information of the information processing apparatus as the identification information relating to the browser.

21. The method according to claim 18, wherein if the information processing apparatus transmits a new change request to the printing apparatus after the session ID used in transmission of the update request is held in association with the identification information of the information processing apparatus, and if the information processing apparatus transmits a new update request to the printing apparatus after the new change request is transmitted to the printing apparatus, in the transmitting, screen information corresponding to the new change request is transmitted to the information processing apparatus as a response to the new update request in a case in which a session ID of the new update request received from the information processing apparatus matches the held session ID.

22. The method according to claim 21, wherein if the session ID of the new update request received from the information processing apparatus does not match the held session ID, in the transmitting, screen information corresponding to the new update request is transmitted to the information processing apparatus as a response to the new update request.

23. The method according to claim 19, wherein the change request is at least one of a request for a screen that displays an error occurring in the printing apparatus, a request for a screen that displays a remaining amount of ink in the printing apparatus, and a request for a screen that displays a remaining amount of sheets in the printing apparatus.

24. The method apparatus according to claim 19, wherein the first screen is at least one of a screen that displays an error occurring in the printing apparatus, a screen that displays a remaining amount of ink in the printing apparatus, and a screen that displays a remaining amount of sheets in the printing apparatus.

* * * * *